US006755985B2

(12) United States Patent
Fiala et al.

(10) Patent No.: US 6,755,985 B2
(45) Date of Patent: Jun. 29, 2004

(54) SILICON-DOPED AMORPHOUS CARBON COATING FOR PAINT BELL ATOMIZERS

(75) Inventors: Aaron Fiala, Newport, MI (US); Jeffrey Petty, Livonia, MI (US); Timothy Jay Potter, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/057,081

(22) Filed: Jan. 25, 2002

(65) Prior Publication Data

US 2002/0066808 A1 Jun. 6, 2002

Related U.S. Application Data

(62) Division of application No. 09/552,132, filed on Apr. 19, 2000, now Pat. No. 6,409,104.

(51) Int. Cl.[7] .......................... B44C 1/22; C03C 15/00; C03C 25/68; C23F 1/00; H05H 1/00

(52) U.S. Cl. ....................................... 216/108; 427/537

(58) Field of Search ................................ 428/408, 621, 428/627, 634; 239/591; 427/249.1, 249.15, 249.7, 902

(56) References Cited

U.S. PATENT DOCUMENTS

| | | | | |
|---|---|---|---|---|
| 4,597,808 A | | 7/1986 | Tachikawa et al. | |
| 4,902,535 A | * | 2/1990 | Garg et al. | 139/292 |
| 4,919,773 A | * | 4/1990 | Naik | 205/170 |
| 5,286,534 A | * | 2/1994 | Kohler et al. | 427/577 |
| 5,458,927 A | * | 10/1995 | Malaczynski et al. | 427/527 |
| 5,783,261 A | * | 7/1998 | Potter et al. | 427/526 |
| 6,086,962 A | * | 7/2000 | Mahoney et al. | 427/577 |

FOREIGN PATENT DOCUMENTS

| | | | | |
|---|---|---|---|---|
| JP | 61035868 A | * | 2/1986 | B05B/5/04 |

* cited by examiner

*Primary Examiner*—Gregory Mills
*Assistant Examiner*—Roberts Culbert
(74) *Attorney, Agent, or Firm*—Damian Porcari

(57) ABSTRACT

A wear resistance coated bell atomizer (32) and method for making same. The coating applied to the outer surface of a bell cup (36) of the bell atomizer (32) is preferably a silicon-doped amorphous carbon coating. This silicon-doped amorphous carbon coating significantly increases the usable life of a bell cup (36) in a bell atomizer paint system (10) by limiting the effects of abrasive materials on the wearable surfaces of the bell cup (36), including the top serrated edges (46), which may negatively affect the performance of uncoated bell atomizer spray equipment.

36 Claims, 3 Drawing Sheets

SILICON-DOPED AMORPHOUS CARBON COATING FOR PAINT BELL ATOMIZERS

CROSS-REFERENCE TO RELATED APPLICATIONS

This is a divisional of U.S. patent application Ser. No. 09/552,132 filed on Apr. 19, 2000 now U.S. Pat. No. 6,409,104.

TECHNICAL FIELD

The present invention relates to polymer coating application equipment and more particularly to components having a wear resistant coating formed thereupon.

BACKGROUND

Rotary paint atomizers (commonly referred to as "bells" or "paint bell atomizers") are typically used for electrostatically applying fluids, such as polymer coatings, to many kinds of surfaces. Current technology uses paint bell atomizers composed of materials such as aluminum and high cost titanium. One problem with current paint bell atomizers is that they tend to wear out quickly (typically 5–7 weeks for paint bells used in automotive applications). When metallic, mica-based, or heavily pigmented coatings are used, the metal flakes, mica flakes, or abrasive pigments within the coatings tend to wear grooves into the surface of the bells. Such degraded paint bell atomizers may then apply coatings having an uneven or globbed appearance, which in turn require expensive and time-consuming defect removal and refinishing. In addition, it is relatively expensive to replace paint bells or paint bell components such as bell cups.

One possible solution to the wearing problem is to use harder metals, such as pure titanium, in the bells. Titanium paint bells typically last longer than bells. Titanium paint bells typically last longer than standard aluminum paint bells, but cost two or three times as much.

SUMMARY OF THE INVENTION

It is an object of the present invention to improve the durability of paint bells without significantly affecting the cost or performance of the equipment.

In accordance with the present invention, a silicon-doped (sometimes referred to as silicon-stabilized) amorphous carbon coating is applied to the wear surfaces, and specifically to the metallic bell cups, of metallic paint bell atomizers. Coated metallic bells have a significantly longer life than standard uncoated aluminum bells and have superior wear characteristics than standard uncoated titanium bells. In this regard, both aluminum and titanium bells have exhibited similar results with coatings applied.

The silicon-doped amorphous carbon coating has the further advantage of being relatively inexpensive to make and apply, especially when compared with the costs associated with replacing aluminum and titanium bell cups or with the cost of replacing an entire bell atomizer.

Other objects and advantages of the present invention will become apparent upon considering the following detailed description and appended claims, and upon reference to the accompanying drawings.

BRIEF DESCRIPTION OF THE DRAWINGS

FIG. 3*c* is an enlarged view of circle A on. FIG. 3*b;*

DESCRIPTION OF THE PREFERRED EMBODIMENT(s)

Figure 1:
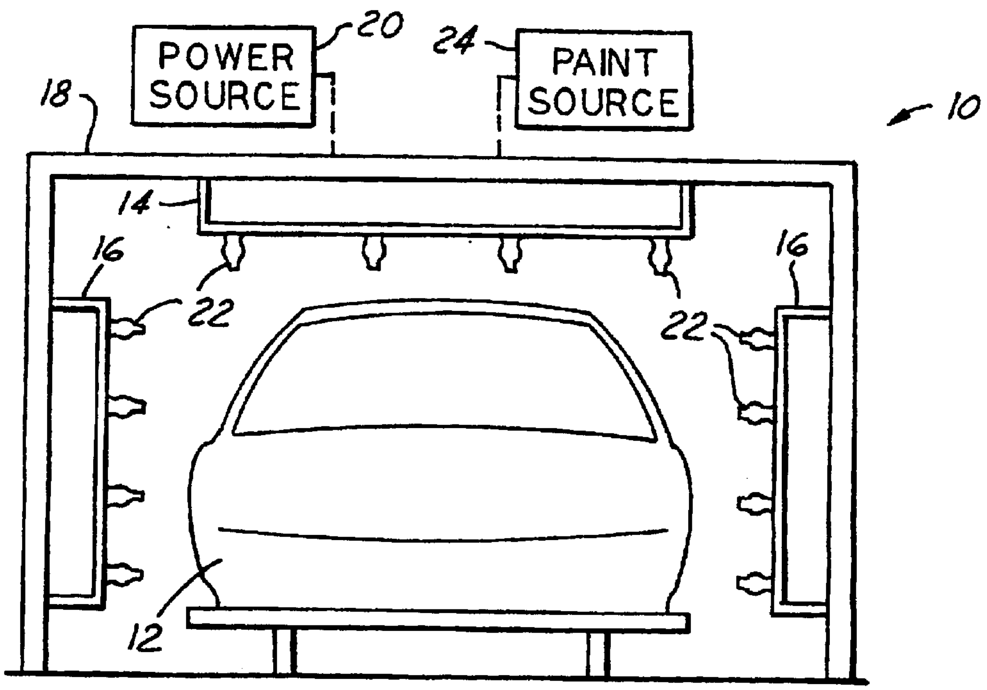
FIG. 1 is a perspective view of a paint spray system according to the present invention.

In the following figures, the same reference numerals will be used to identify identical components in the various views. The present invention is illustrated with respect to automated spray application equipment particularly suited for the automotive field. However, the present invention is applicable to various uses such as consumer appliances, industrial machinery, and other paint processes.

Referring now to FIG. 1, a paint spray system 10 for painting a part or surface is illustrated having a plurality of robotic arms that may include an overhead arm 14 and side arms 16. Each arm 14, 16 is coupled to a rack 18. In such systems, arms 14, 16 move according to XYZ coordinates with respect to rack 18. Commonly, the XYZ coordinates of arms 14, 16 vary depending upon the part 12 to be painted. It is common, for example, to maintain a predetermined distance from the surface to be painted. Each arm 14, 16 has a plurality of motors (not shown) that permit movement of the arms 14, 16 into desired positions with respect to part 12. A power source 20 is coupled to paint spray system 10 to power arms 14, 16. Each arm 14, 16 has a paint atomizer head 22 positioned thereon. As will be further described below, each paint atomizer head 22 generates a desired paint spray with respect to part 12. Each paint atomizer head 22 is fluidically coupled to a paint source 24 that supplies paint thereto.

Figure 2:
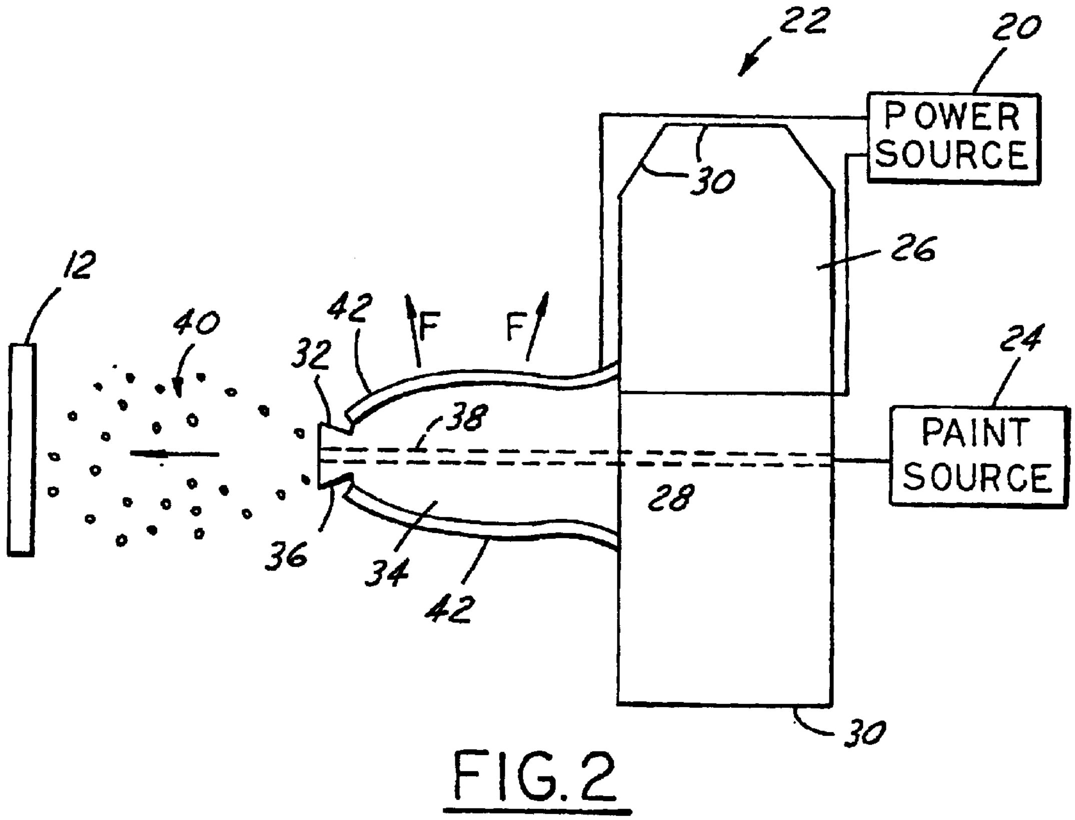
FIG. 2 is a cross-sectional view of a paint atomizer head formed according to the present invention.

Referring now to FIG. 2, an atomizer head 22 is illustrated in further detail. Atomizer head 22 has a support housing 26 with a front surface 28 that faces the parts 12 to be painted. Support housing 26 also has a plurality of other surfaces such as side surfaces. As would be evident to those skilled in the art, various shapes of heads 22 may be used. For example, side arms 16 may use different heads than overhead heads. The teachings set forth herein, are applicable to all types of heads 22.

Front surface 28 has a bell-atomizer 32 extending therefrom. Bell-atomizer 32 has a bell housing 34 and a bell cup 36. Bell cups 36 are typically composed of aluminum or titanium. A paint channel 38 extends through the bell-atomizer 32 and support housing 26 and eventually couples to the paint source 24. Bell-atomizers 32 in their operation are well known in the art. Bell cups 36 receive paint from paint channel 38. Bell cups 36 rotate to generate stream lines (atomization) directing paint particles 40 to part 12. In addition to the stream lines directing paint particles 40 to part 12, the bell-atomizer 32 is coupled to power source 20 to impart a potential difference on paint particles 40 relative to the part 12 so that they are directed electrically to part 12. Thus, a potential difference exists between particles 40 and part 12.

FIGS. 3*a–d* refer to the bell cups 36 both prior to and after use on a paint system 10.

Figure 3A:
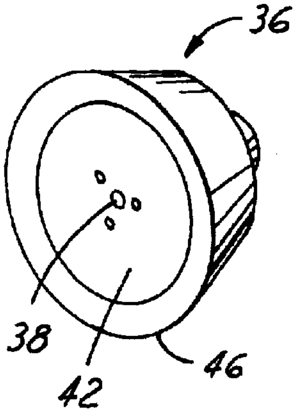
FIG. 3*a* is a perspective view of an uncoated bell cup prior to use on a paint system.

Referring to FIG. 3*a*, a pristine uncoated bell cup 36 is shown having a paint channel 38 and a distribution disk 42 prior to installation on a paint system 10. The bell cup 36 also has an inner cavity wall (shown as 44 on FIG. 3*b*) and a serrated edge 46.

Figure 3C:
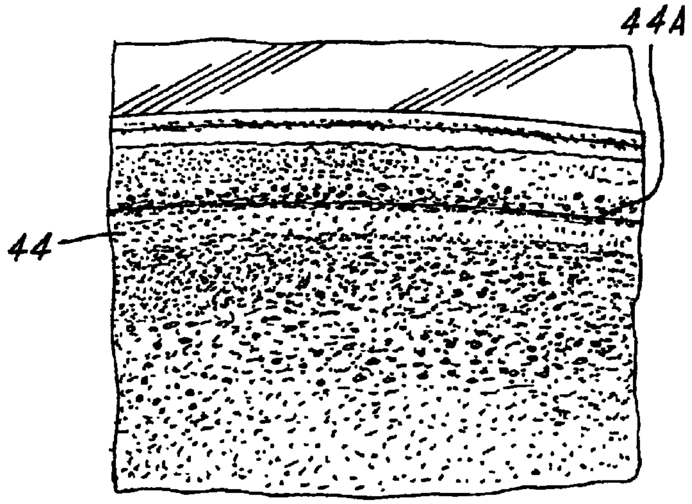
Figure 3B:
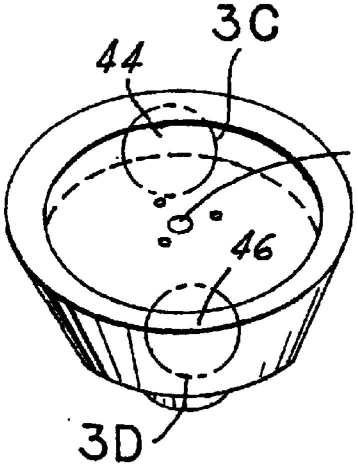
FIG. 3*b* is a perspective view of an uncoated bell cup after use on a paint system.
Figure 3D:
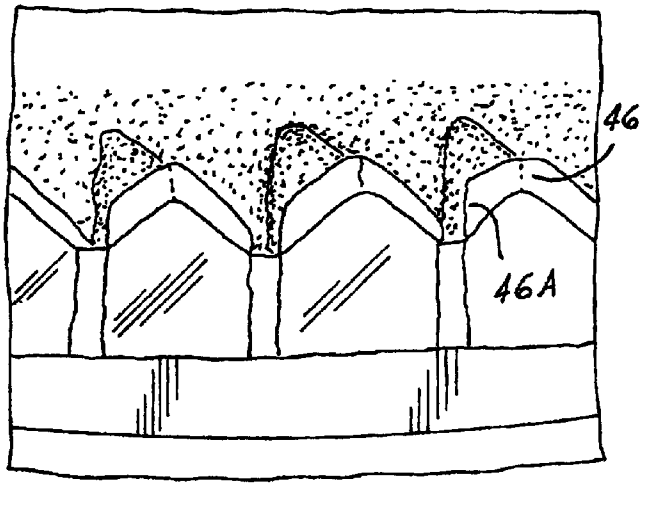
FIG. 3*d* is an enlarged vied of circle B on FIG. 3*b;*

FIGS. 3*b–d* shows the same bell cup 36 as FIG. 3*a* after use in a paint system 10 for a period of time. The atomization rates (typically around 40–60,000 rpm) and fluid flow rates (typically around 100–400 cc's per minute) of coatings through a bell-atomizer 32 have a tendency to wear grooves 44A on the inner cavity wall 44, as shown best in FIG. 3*c*, and wear grooves 46A on the serrated edges 46, as shown best in FIG. 3*d*, of bell-atomizers 32. Metallic or mica-content in coatings, such as automotive basecoats, increases this wear rate dramatically. Heavily pigmented coatings, such as primers, have a similar effect.

As shown in FIGS. 3*b* and 3*c*, the wear on either side of the distribution disk 42 forms grooves 44A on the inner cavity wall 44 over the course of time. These grooves 44*a* can cause bell fluid flow deviation, plugging, and spitting. The grooves 46A formed on the serrated edge 46, as shown in FIG. 3*d*, may cause irregular atomization and spitting.

The present invention addresses these wearing problems by adding a silicon-doped amorphous carbon coating to the surfaces of the bell cup 36. The silicon-doped amorphous carbon coating increases the wear performance of both aluminum and titanium bell-atomizers 32 without adding significant cost.

Figure 4:
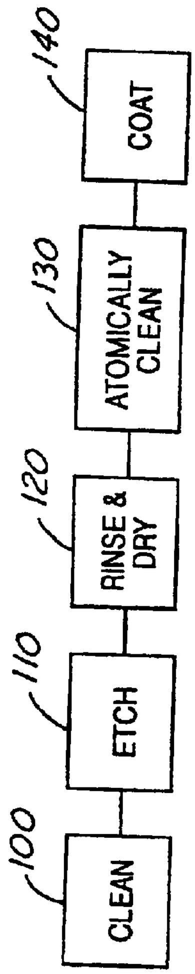
FIG. 4 is a logic flow diagram for the preparation and coating of the bell cups.

FIG. 4 illustrates a general logic flow diagram for preparing and coating the surface of the metallic bell cups 36. To prepare the bell cups 36 for the silicon-doped amorphous carbon coating, the bell cups 36 are first cleaned with a combination of water, soap, and solvent in Step 100. Next, the bell cups 36 are etched, rinsed, and etched again for a predetermined time. The bell cups 36 are then rinsed with water, air dried and then vacuum dried for a predetermined time in Step 120.

Next, the bell cups 36 are atomically cleaned in Step 130 by argon bombardment at 200V, 500V, and 200V again. The bell cups 36 are then coated in Step 140 with a silicon-doped amorphous carbon coating. A more detailed logic flow diagram of the preparation and coating of aluminum bell cups 36 according to a preferred embodiment is shown below in FIG. 5, while a more detailed logic flow diagram of the preparation of titanium bell cups 36 according to another preferred embodiment is shown below in FIG. 6.

Figure 5:
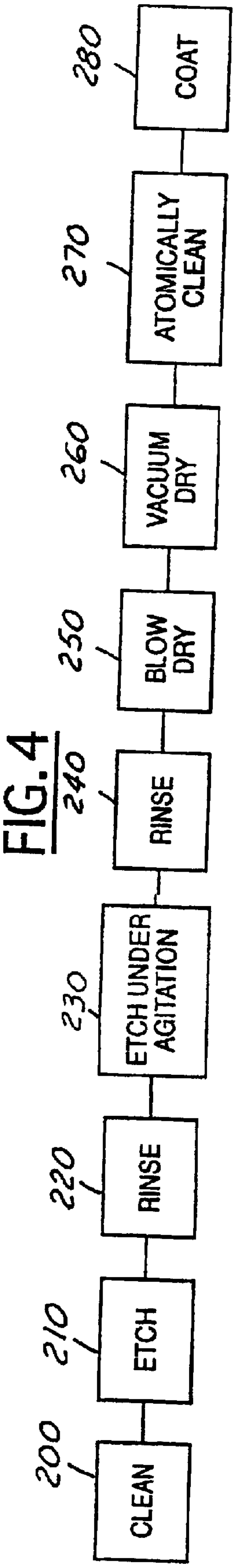
FIG. 5 is a more detailed logic flow diagram of FIG. 4 for coating an aluminum bell cup.

Referring now to FIG. 5, the surfaces of the aluminum bell cups 36 are first cleaned with soap, water, and solvent in Step 200. Next, in Step 210, the aluminum bell cups 36 are etched with a 5% solution of sodium hydroxide for 20 seconds, often under ultrasonic agitation. In Step 220, the aluminum bell cups 36 are rinsed in water, and in Step 230 the aluminum bell cups 36 are etched in a 1% nitric acid solution for 5 minutes under ultrasonic agitation. The aluminum bell cup 36 is then rinsed with water in Step 230 and blown dry in Step 240. The bell cups 36 are then placed in a vacuum pressure chamber pressurized to $10^{-7}$ torr in Step 260. While Steps 200 through 260 are the preferred method for preparing the surface of the aluminum bell cups 36 for applying a coating, it is contemplated that some of these steps may be unnecessary or may be altered to achieve the same desired result.

In Step 270, the aluminum bell cups 36 are atomically cleaned by argon bombardment at 200V, 500V, and 200V again. The aluminum bell cups are now ready to have the silicon-doped amorphous carbon coating applied.

In Step 280, a layer of silicon-doped amorphous carbon coating is applied to the bell cups 36 by placing the bell cups 36 in a chamber containing a gaseous mixture of methane and tetramethylsilane. A 13.56 MHz radio frequency power source is turned on until a 500V bias is achieved. A 10–15% silicon film is deposited on the surface of the aluminum bell cups 36 after approximately 3 hours. The coated bell cups 36 are ready for use in an atomizer 32 system.

While Step 280 represents the preferred method for coating an aluminum bell cup 36, it is contemplated that other dopants may be used. For example, tungsten-doped or titanium-doped amorphous carbon may be used. In addition, other hydrocarbons may replace methane. These hydrocarbons include acetylene, ethene, butane, pentyne, and benzene. Also, other sources of silicon will work as well, such as diethylsilane. Finally, other frequencies or voltage biases may be used. For example, frequencies other than 13.56 MHz may be used, including pulsed direct current. A range of voltage biases varying from 200V to 1000V may be used as well, with 200V biases giving the hardest film and 1000V biases having the fastest deposition rate.

Figure 6:
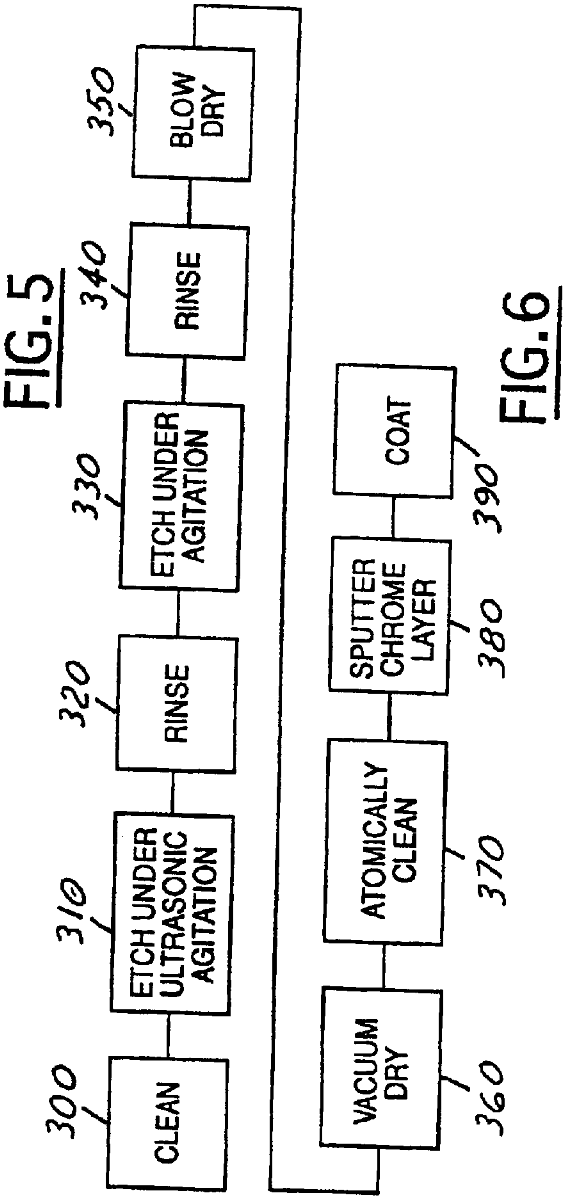
FIG. 6 is a more detailed logic flow diagram of FIG. 4 for coating a titanium bell cup.

Referring now to FIG. 6, the surfaces of the titanium bell cups 36 are cleaned with soap, water, and solvent in Step 300. Next, in Step 310, the titanium bells 36 are etched for 60 seconds in a 3% nitric acid in ethanol solution under ultrasonic agitation. The titanium bell cup 36 is rinsed with water in Step 320, and then placed in ethanol for 5 minutes under agitation in Step 330.

The titanium bell cups 36 are then rinsed with water in Step 340 and blown dry in Step 350. The titanium bell cups 36 are then placed in a vacuum chamber a pressurized to $10^{-7}$ torr in Step 360. While Steps 300 through 360 are the preferred method for preparing the surface of the titanium bell cups 36 for applying a coating, it is contemplated that some of these steps may be unnecessary or may be altered to achieve the desired result.

In Step 370, the aluminum bell cups 36 are atomically cleaned by argon bombardment at 200V, 500V, and 200V again. A sputtered layer of chrome is then applied to the surface of the titanium bells 36 in Step 380. The chrome layer serves as an adhesion promoter for the silicon-doped amorphous carbon coating.

A layer of silicon-doped amorphous carbon coating is applied to the chrome surface of the titanium bell cup 36 in Step 380. This is accomplished by placing the bell cups 36 in a chamber containing a gaseous mixture of methane and tetramethylsilane. A 13.56 MHz radio frequency power source is turned on until a 500V bias is achieved. A 10–15% silicon film is deposited on the surface of the bells 36 after approximately 3 hours. The coated bell cups 36 are ready for use in an atomizer 32 system.

While Step 380 represents the preferred method for coating a titanium bell cup 36, it is contemplated that other silicon dopants may be used. For example, tungsten-doped or titanium-doped amorphous carbon may be used. In addition, other hydrocarbons may replace methane. These hydrocarbons include acetylene, ethene, butane, pentyne, and benzene. Also, other sources of silicon will work as well, such as diethylsilane. Finally, other frequencies or voltage biases may be used. For example, frequencies other than 13.56 MHz may be used, including pulsed direct current. A range of voltage biases varying from 200V to 1000V may be used as well, with 200V biases giving the hardest film and 1000V biases having the fastest deposition rate.

While the preferred method for applying an amorphous carbon coating is described above, it is understood that there are many other methods for applying doped amorphous carbon coatings to aluminum and titanium surfaces that are well known in the art, such as laser ablation, ion beam assisted bombardment and ion beam bombardment.

Validation studies were performed to show that the silicon-doped amorphous carbon coatings improved the wear resistance of the aluminum and titanium bell cups 36.

In one validation study, four bell cups 36 were used. Two aluminum Behr Eco-bell cups 36 were coated with silicon-doped amorphous coating according to the preferred embodiment of the present invention, as detailed above. One uncoated aluminum Behr Eco-bell cup 36 and one uncoated titanium Behr Eco-bell cup 36 were also used.

The four cups 32 were placed on a main enamel basecoat line, with coated and non-coated bells 32 placed on opposite sides of a paint booth on two pairs of Behr SF3 side machines. The opposing pairs of side machines were set up with identical spray programs. The machines were run continuously for 10 weeks, 20 hours per day. The bells 36 were taken off line only for cleaning and photographing.

Photomicrographs were taken of each bell cup 36 once per week. Digital images were taken of the inside cavity wall 44 and the serrated edge 46 of each cup 36 at approximately 10× magnification. All photographs were labeled and mounted in an album. Time of failure was determined by comparison of the photomicrographs to photomicrographs of other failed bell cups 36. In addition, time to failure was determined by evaluating sprayed surfaces for defects associated with worn bell cups 36.

During the course of the experiment, each bell cup 36 exhibited a progressive wear pattern as the time of service increased. The uncoated aluminum bell 36, showed significant abrasive wear starting from the first exposure to the abrasive painting environment, and by six weeks was taken off line due to severe wear. The titanium bell cup 36 held up for the entire test period, but showed increase in surface wear with respect to time in service. The coated aluminum bell cups 36 showed no significant abrasive wear on the inner cavity wall 44 of the bell cups 36.

The serrated top edges 46 of the aluminum and titanium uncoated bell cups 36 both displayed signs of abrasive wear on the serrated teeth of the inner surface, conditions that can cause spitting and other related surface irregularities. No significant wear was evident on either the coated aluminum or titanium bell cups 36 during the 10-week study.

The test conclusions indicated that the bell-cups 36 that had silicon-doped amorphous coatings lasted at least twice as long as the standard uncoated aluminum bell cups 36. The tests also indicated that titanium bell cups 36, while superior to standard aluminum cups 36, were inferior to the coated bell cups 36 of the present invention for the bell application of an enamel basecoat.

While the invention has been described in terms of preferred embodiments, it will be understood, of course, that the invention is not limited thereto since modifications may be made by those skilled in the art, particularly in light of the foregoing teachings.

What is claimed is:

1. A method for improving wear resistance of the outer surface of an aluminum bell cup, the method comprising the steps of:

preparing the outer surface of the aluminum bell cup;

placing the aluminum bell cup in a chamber containing a power source and a gaseous mixture of hydrocarbons and silicon-doped hydrocarbons; and applying a predetermined frequency and voltage bias from said power source for a predetermined time to coat the outer surface of the aluminum bell cap with a silicon-doped hydrocarbon composition at a predetermined film thickness.

2. The method according to claim 1, wherein the step of preparing the outer surface of the aluminum bell cup comprises the steps of:

cleaning said outer surface;

etching said outer surface;

rinsing said outer surface;

drying said outer surface; and atomically cleaning said outer surface.

3. The method according to claim 2, wherein the step of cleaning said outer surface comprises the steps of:

cleaning said outer surface with a soap solution;

cleaning said outer surface with water; and cleaning said outer surface with solvent.

4. The method according to claim 2, wherein the step of etching said outer surface comprises the steps of:

etching said outer surface with a 5% solution of sodium hydroxide for a predetermined time;

rinsing said outer surface with water; and etching said outer surface with a 1% nitric acid solution for a second predetermined time under ultrasonic agitation.

5. The method according to claim 2, wherein the step of drying said outer surface comprises the step of:

blow drying said outer surface with air; and placing the aluminum bell cup in a vacuum pressure chamber for a predetermined time at a predetermined pressure.

6. The method according to claim 2, wherein the step of atomically cleaning said outer surface comprises the steps of:

atomically cleaning said outer surface by argon bombardment at 200 volts; atomically cleaning said outer surface by argon bombardment at 500 volts; and atomically cleaning said outer surface by argon bombardment at 200 volts.

7. The method according to claim 1, wherein the step of placing the aluminum bell cup in a chamber containing a power source and a gaseous mixture of hydrocarbons and silicon-doped hydrocarbons comprises the step of:

placing the aluminum bell cup in a chamber containing a power source and a gaseous mixture of methane and tetramethylsilane.

8. A method for improving wear resistance of the outer surface of a titanium bell cup, the method comprising the steps of:

preparing the outer surface of the titanium bell cup;

applying an adhesion promoter coating to the outer surface;

placing the titanium bell cup in a chamber containing a power source and a gaseous mixture of hydrocarbons and silicon-doped hydrocarbons; and applying a predetermined frequency and voltage bias from said power source for a predetermined time to coat said adhesion promoter coating with a silicon-doped hydrocarbon composition at a predetermined film thickness.

9. The method according to claim 8, wherein the step of preparing said outer surface of the titanium bell cup comprises the steps of:

cleaning said outer surface;

etching said outer surface;

rinsing said outer surface;

drying said outer surface; and atomically cleaning said outer surface.

10. The method according to claim 9, wherein the step of cleaning said outer surface comprises the steps of:

cleaning said outer surface with a soap solution;

cleaning said outer surface with water; and cleaning said outer surface with solvent.

11. The method according to claim 9, wherein the step of etching said outer surface comprises the steps of:

etching said outer surface for a predetermined time in a 3% nitric acid in ethanol solution under ultrasonic agitation;

rinsing said outer surface with water; and immersing the titanium bell cup in ethanol for a second predetermined time under agitation.

12. The method according to claim 9, wherein the step of drying said outer surface comprises the step of:

blow drying said outer surface with air; and placing the titanium bell cup in a vacuum pressure chamber for a predetermined time at a predetermined pressure.

13. The method according to claim 9, wherein the step of atomically cleaning said outer surface comprises the steps of:

atomically cleaning said outer surface by argon bombardment at 200 volts;

atomically cleaning said outer surface by argon bombardment at 500 volts; and atomically cleaning said outer surface by argon bombardment at 200 volts.

14. The method according to claim 8, wherein the step of applying an adhesion promoter coating to said outer surface comprises the step of sputtering a layer of chrome on said outer surface to a predetermined thickness.

15. The method according to claim 8, wherein the step of placing the titanium bell cup in a chamber containing a power source and a gaseous mixture of hydrocarbons and silicon-doped hydrocarbons comprises the step of:

placing the titanium bell cup in a chamber containing a power source and a gaseous mixture of methane and tetramethylsilane.

16. A method for improving wear resistance of the outer spraying surface of spray application equipment, the method comprising the steps of:

preparing the outer spraying surface of the spray application equipment;

placing the spray application equipment in a chamber containing a power source and a gaseous mixture of hydrocarbons and silicon-doped hydrocarbons; and applying a predetermined frequency and voltage bias from said power source for a predetermined time to coat the outer spraying surface of the spray application equipment with a silicon-doped hydrocarbon composition at a predetermined film thickness.

17. The method according to claim 16, wherein the step of preparing the outer spraying surface of the spray application equipment comprises the steps of:

cleaning said outer spraying surface;

etching said outer spraying surface;

rinsing said outer spraying surface;

drying said outer spraying surface; and atomically cleaning said outer spraying surface.

18. The method according to claim 17, wherein the step of cleaning said outer spraying surface comprises the steps of:

cleaning said outer spraying surface with a soap solution;

cleaning said outer spraying surface with water; and cleaning said outer spraying surface with solvent.

19. The method according to claim 17, wherein the step of etching said outer spraying surface comprises the steps of:

etching said outer spraying surface with a 5% solution of sodium hydroxide for a predetermined time;

rinsing said outer spraying surface with water; and etching said outer spraying surface with a 1% nitric acid solution for a second predetermined time under ultrasonic agitation.

20. The method according to claim 17, wherein the step of drying said outer spraying surface comprises the step of:

blow drying said outer spraying surface with air; and placing the spray application equipment in a vacuum pressure chamber for a predetermined time at a predetermined pressure.

21. The method according to claim 17, wherein the step of atomically cleaning said outer spraying surface comprises the steps of:

atomically cleaning said outer spraying surface by argon bombardment at 200 volts;

atomically cleaning said outer spraying surface by argon bombardment at 500 volts; and atomically cleaning said outer spraying surface by argon bombardment at 200 volts.

22. The method according to claim 16, wherein the step of placing the spray application equipment in a chamber containing a power source and a gaseous mixture of hydrocarbons and silicon-doped hydrocarbons comprises the step of:

placing the spray application equipment in a chamber containing a power source and a gaseous mixture of methane and tetramethylsilane.

23. The method of claim 16 further comprising the step of applying an adhesion promoter to said outer spraying surface of the spray application equipment prior to the step of placing the spray application equipment in a chamber containing a power source and a gaseous mixture of hydrocarbons and silicon-doped hydrocarbons.

24. The method according to claim 23, wherein the step of applying an adhesion promoter coating to said outer spraying surface comprises the step of sputtering a layer of chrome on said outer spraying surface to a predetermined thickness.

25. The method according to claim 1, wherein the step of placing the aluminum bell cup in a chamber containing a power source and a gaseous mixture of hydrocarbons and silicon-doped hydrocarbons comprises the step of:

placing the aluminum bell cup in a chamber containing a power source and a gaseous mixture of methane and diethylsilane.

26. The method according to claim 1, wherein the step of placing the aluminum bell cup in a chamber containing a power source and a gaseous mixture of hydrocarbons and silicon-doped hydrocarbons comprises the step of:

placing the aluminum bell cup in a chamber containing a power source and a gaseous mixture of a first hydrocarbon and tetramethylsilane, said first hydrocarbon selected from the group consisting of acetylene, ethene, butane, pentyne, and benzene.

27. The method according to claim 1, wherein the step of placing the aluminum bell cup in a chamber containing a power source and a gaseous mixture of hydrocarbons and silicon-doped hydrocarbons comprises the step of:

placing the aluminum bell cup in a chamber containing a power source and a gaseous mixture of a first hydrocarbon and diethylsilane, said first hydrocarbon selected from the group consisting of acetylene, ethene, butane, pentyne, and benzene.

28. The method according to claim 8, wherein the step of placing the titanium bell cup in a chamber containing a power source and a gaseous mixture of hydrocarbons and silicon-doped hydrocarbons comprises the step of;

placing the titanium bell cup in a chamber containing a power source and a gaseous mixture of methane and diethylsilane.

29. The method according to claim 8, wherein the step of placing the titanium bell cup in a chamber containing a power source and a gaseous mixture of hydrocarbons and silicon-doped hydrocarbons comprises the step of:

placing the titanium bell cup in a chamber containing a power source and a gaseous mixture of a first hydrocarbon and tetramethylsilane, said first hydrocarbon selected from the group consisting of acetylene, ethene, butane, pentyne, and benzene.

30. The method according to claim 8, wherein the step of placing the titanium bell cup in a chamber containing a power source and a gaseous mixture of hydrocarbons and silicon-doped hydrocarbons comprises the step of:

placing the titanium bell cup in a chamber containing a power source and a gaseous mixture of a first hydrocarbon and diethylsilane, said first hydrocarbon selected from the group consisting of acetylene, ethene, butane, pentyne, and benzene.

31. A method for improving wear resistance of the outer surface of spray application equipment, the method comprising the steps of:

preparing the outer surface of the spray application equipment;

placing the spray application equipment in a chamber containing a power source and a gaseous mixture of hydrocarbons and tungsten-doped hydrocarbons; and applying a predetermined frequency and voltage bias from said power source for a predetermined time to coat the outer surface of the spray application equipment with a tungsten-doped hydrocarbon composition at a predetermined film thickness.

32. The method according to claim 31, wherein the spray application equipment comprises an aluminum bell cup.

33. The method according to claim 31, wherein the spray equipment comprises a titanium bell cup coated with an adhesion promoter.

34. A method for improving wear resistance of the outer surface of an aluminum bell cup, the method comprising the steps of:

preparing the outer surface of the aluminum bell cup;

placing the aluminum bell cup in a chamber containing a power source and a gaseous mixture of hydrocarbons and titanium-doped hydrocarbons; and applying a predetermined frequency and voltage bias from said power source for a predetermined time to coat the outer surface of the aluminum bell cap with a titanium-doped hydrocarbon composition at a predetermined film thickness.

35. The method according to claim 34, wherein the spray application equipment comprises an aluminum bell cup.

36. The method according to claim 35, wherein the spray equipment comprises a titanium bell cup coated with an adhesion promoter.

* * * * *